(No Model.)
I. ARNOLD.
DEVICE FOR JOINTING, GAGING, AND SETTING SAWS.
No. 604,574. Patented May 24, 1898.
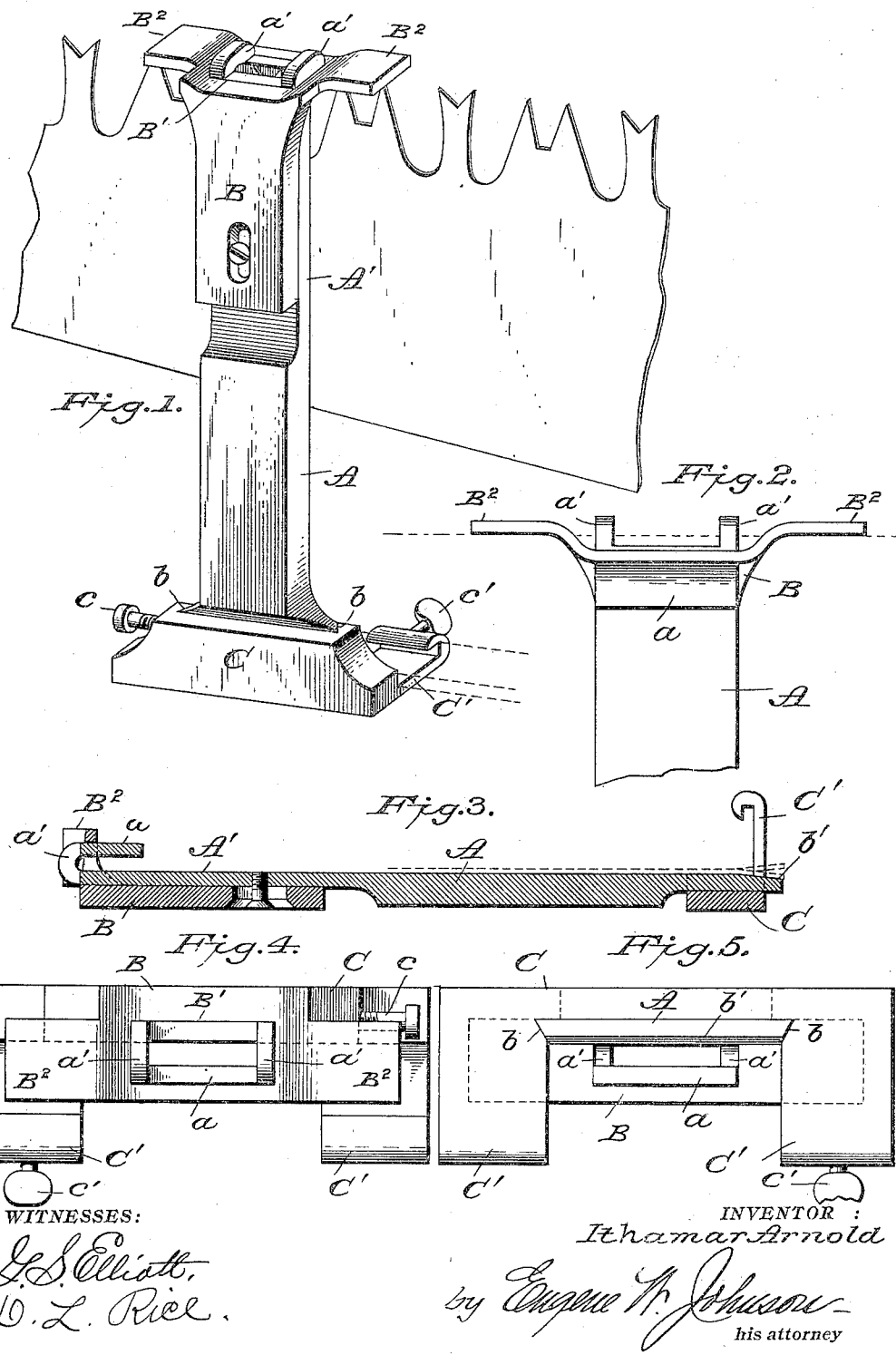
WITNESSES:
J. S. Elliott.
D. L. Rice.
INVENTOR:
Ithamar Arnold
by Eugene W. Johnson
his attorney

UNITED STATES PATENT OFFICE.

ITHAMAR ARNOLD, OF LA FARGEVILLE, NEW YORK, ASSIGNOR OF ONE-HALF TO PERLEY K. FOOTE, OF SAME PLACE.

DEVICE FOR JOINTING, GAGING, AND SETTING SAWS.

SPECIFICATION forming part of Letters Patent No. 604,574, dated May 24, 1898.

Application filed September 1, 1897. Serial No. 650,252. (No model.)

*To all whom it may concern:*

Be it known that I, ITHAMAR ARNOLD, a citizen of the United States of America, residing at La Fargeville, in the county of Jefferson and State of New York, have invented certain new and useful Improvements in Devices for Jointing, Gaging, and Setting Saws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in devices for jointing, gaging, and setting saws, the object of the same being to provide a device for jointing, gaging, and setting the teeth of crosscut-saws; and the invention consists in the special construction and combination of the parts which comprise an implement, as will be hereinafter set forth, and specifically pointed out in the claims.

In the accompanying drawings, which illustrate my invention, Figure 1 is a perspective view showing the implement applied to a crosscut-saw as used when jointing or filing the drag-teeth of the saw below the level of the cutting-teeth. Fig. 2 is a side elevation showing the opposite side of the gage. Fig. 3 is a longitudinal sectional view. Fig. 4 is a plan or top view looking down upon the implement as shown in Fig. 1, and Fig. 5 is a view in plan of the opposite end of the implement.

A refers to the central or body portion of the tool or implement, said part being reduced in thickness at one end, as shown at A', the upper end thereof being cut away and turned upon itself to provide an overhanging portion $a$, which is connected to the body portion A' by the side pieces $a'$. The opposite end of the body portion A is reduced as to thickness and flares outwardly, so as to be of greater width than the opposite end, and the edges are beveled, as shown at $b\ b$, and the lower end is also beveled, as shown at $b'$, to provide an inclined portion for setting the saw-teeth. The thickness of the body portion of the implement is reduced in thickness, so that both sides will be parallel when the attachments to be hereinafter described are secured thereto, so as to provide plain or flat surfaces upon which the saw may rest when setting the teeth, as shown in Fig. 3, or in jointing the drag-teeth, as shown in Fig. 1. In setting the teeth the implement may lie flat upon a table or work-bench.

B refers to a saw-filing gage which is adjustably connected to the part A' of the body portion by a set-screw which passes through a slot in the part B, and this gage-piece B has an opening or aperture B' in that part thereof which projects at right angles, and beyond this opening there are laterally-extending end portions $B^2$, which project laterally and are adapted to engage with the teeth of the saw. In use the saw-filing gage is used for jointing or filing the drag-teeth, so that they may be positioned below the level of the cutting-teeth, and in use the gage B is adjusted upon the body portion by means of a set-screw, so that the laterally-projecting portion will engage with the cutting-teeth of the saw and permit the drag-teeth to project through the opening and be engaged by a file.

When it is desired to joint the saw or bring all the points of the teeth to the same level, a file-holding block C is attached to the end of the body portion A of the implement to which it is secured, so as to be adjustable thereon, by means of a set-screw $c$. The file-holding block or frame C has projecting members C', and one of said members has a set-screw $c'$, which is adapted to impinge against one edge of a flat file to retain the same in the frame C. The projecting members C' provide efficient gages or stops which may be used when the file is removed, in connection with the beveled face $b'$, in setting the saw.

The implement hereinbefore described is simple in construction and provides two adjustable gages, one at each end of the body portion, so that the device may not only be used for jointing and setting saws, but also as a gage.

Having thus described my invention, what I claim as new, and desire to secure by Letters Patent, is—

1. In an implement for jointing saws the combination with the body portion A, one end of which is bent to provide an overlying member or portion $a$ which is cut away centrally to provide an aperture for the passage of the teeth of a saw, and a gage which is adjustably secured to the body portion and provided with laterally-extending members substantially as shown and for the purpose set forth.

2. In an implement for jointing and setting saws the combination with a body portion A, having one end beveled, the opposite end being bent upon itself and centrally cut away; together with a saw-filing gage adjustably secured to one end of the body portion, said gage having an aperture and laterally-extending members and a file-holding frame adjustably mounted on the opposite end of the body portion, substantially as shown and for the purpose set forth.

3. In a saw-sharpening implement or tool, the combination with the body portion A, the ends thereof being reduced in thickness, of a saw-filing gage adjustably secured to one end of the body portion and a file-holding frame adjustably secured to the opposite end of the body portion for the purpose set forth.

4. In a saw-jointer, the combination of a frame or body portion A, bent upon itself so as to provide an overlying portion $a$ having connecting portions $a'$ and an aperture between said portions through which the saw-teeth may pass, in combination with a saw-filing gage which is adjustably secured to the body portion and provided with an aperture through which the body portion passes, said gage having laterally-projecting portions $B^2$, substantially as shown and for the purpose set forth.

In testimony whereof I affix my signature in presence of two witnesses.

ITHAMAR ARNOLD.

Witnesses:
L. S. STROUGH,
B. A. SARGENT.